United States Patent
Jones et al.

(10) Patent No.: US 8,727,410 B2
(45) Date of Patent: May 20, 2014

(54) METHOD AND DEVICE FOR MANIPULATING AN OBJECT

(75) Inventors: Christopher Vernon Jones, Woburn, MA (US); Erik Edward Steltz, Melrose, MA (US); Annan Michael Mozeika, Winchester, MA (US)

(73) Assignee: iRobot Corporation, Bedford, MA (US)

( * ) Notice: Subject to any disclaimer, the term of this patent is extended or adjusted under 35 U.S.C. 154(b) by 546 days.

(21) Appl. No.: 12/711,983

(22) Filed: Feb. 24, 2010

(65) Prior Publication Data

US 2010/0217436 A1 Aug. 26, 2010

Related U.S. Application Data

(63) Continuation-in-part of application No. 12/553,971, filed on Sep. 3, 2009, now abandoned.

(60) Provisional application No. 61/155,135, filed on Feb. 24, 2009.

(51) Int. Cl.
*A61F 2/54* (2006.01)

(52) U.S. Cl.
USPC .............. 294/183; 700/245; 901/36; 901/40; 623/57

(58) Field of Classification Search
USPC ............. 701/2; 414/739, 800, 4; 633/24, 157; 901/8, 9, 2, 30, 31, 36, 40; 397/216.12; 623/24, 57; 294/183; 700/245
See application file for complete search history.

(56) References Cited

U.S. PATENT DOCUMENTS

| | | | |
|---|---|---|---|
| 4,493,877 A | 1/1985 | Burnett | |
| 6,168,634 B1* | 1/2001 | Schmitz | 623/24 |
| 6,226,820 B1 | 5/2001 | Navarro | |
| 6,267,364 B1 | 7/2001 | Zhang | |
| 6,308,353 B1 | 10/2001 | Van Steenburg | |
| 7,758,121 B2* | 7/2010 | Browne et al. | 297/284.11 |
| 2009/0037033 A1* | 2/2009 | Phillips et al. | 701/2 |
| 2010/0217163 A1* | 8/2010 | Sankai | 601/5 |

FOREIGN PATENT DOCUMENTS

WO  WO2006082100(A1)  8/2006

OTHER PUBLICATIONS

Klingbeil, E. et al., "Learning to Open New Doors," *Robotics Science and Systems (RSS) workshop on Robot Manipulation*, 2008.

* cited by examiner

*Primary Examiner* — Ronnie Mancho
(74) *Attorney, Agent, or Firm* — Honigman Miller Schwartz and Cohn LLP

(57) ABSTRACT

A method for manipulating an object with a remote vehicle having a manipulator attached to a manipulator arm. The manipulator comprises a jamming or other phase change material in a housing. The method comprises pressing the manipulator housing to the object, activating the jamming or other phase change material to cause the manipulator to grasp the object, and moving one or more of the manipulator arm and the remote vehicle to manipulate the object.

17 Claims, 12 Drawing Sheets

US 8,727,410 B2

METHOD AND DEVICE FOR MANIPULATING AN OBJECT

This application is a continuation-in-part of U.S. patent application Ser. No. 12/553,971, filed Sep. 3, 2009 now abandoned, and claims priority to U.S. Provisional Patent Application No. 61/155,135, filed Feb. 24, 2009.

The present teachings relate to using a manipulator comprising a housing filled at least partially with a jamming or other phase change material to grasp and manipulate objects. The present teachings relate more particularly to using a housing filled at least partially with a jamming or other phase change material, located on a manipulator arm of a remote vehicle, to grasp and manipulate objects.

BACKGROUND

It is known to use remote vehicles such as robots to manipulate objects. Remote vehicles can include a manipulator arm specifically for the purpose of manipulating objects. Manipulator arms typically include two- or three-fingered grippers for manipulation. Such manipulation can include, for example, grasping and moving objects by positioning, opening, and closing the gripper fingers. More complex manipulation can include, for example, opening a door by turning a door knob.

Existing two- and three-fingered grippers can be difficult to manipulate for picking up smaller objects, for example a pencil-sized object from the ground, even when being utilized by a trained operator. Extensive training and practice may be required to become proficient in using grippers for certain tasks, for example picking up smaller objects and/or performing more complex tasks such as door opening.

SUMMARY

In accordance with various embodiments, the present teachings include a method for manipulating an object with a remote vehicle having a manipulator attached to a manipulator arm. The manipulator comprises a jamming or other phase change material in a housing. The method comprises pressing the manipulator housing to the object, activating the jamming or other phase change material to cause the manipulator to grasp the object, and moving the manipulator arm and/or the remote vehicle to manipulate the object.

In accordance with other embodiments, the present teachings comprise a system allowing the remote vehicle to manipulate an object. The system comprises a manipulator arm having proximal and distal ends and being attached to the remote vehicle at the proximal end, a manipulator located at the distal end of the manipulator arm and comprising a housing and a jamming material within the housing, and a device for activating the jamming material. An object is manipulated by moving the manipulator arm to press the manipulator housing to the object, activating the jamming material to cause the manipulator to grasp the object, and moving the manipulator arm and/or the remote vehicle.

In accordance with further embodiments, the present teachings comprise a method for using a remote vehicle having a manipulator attached to a manipulator arm to open a door, the door having a knob and the manipulator comprising a jamming material in a housing. The method comprises actuating the manipulator arm to press the manipulator housing to the knob, activating the jamming material to cause the manipulator to grasp the knob, rotating the manipulator and thus the knob to unlatch the door, and moving the manipulator arm to pull or push the door to an open position.

In accordance with yet further embodiments, the present teachings comprise a manipulator to be used on a manipulator arm of a remote vehicle. The manipulator comprises a housing filled with a jamming or other phase change material. The manipulator is pressed to an object to be manipulated and grasps the object when a rigidity of the manipulator is increased by effecting a change in a state of the jamming or other phase change material.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate several embodiments of the present teachings and together with the description, serve to explain the principles of the present teachings.

DESCRIPTION OF EXEMPLARY EMBODIMENTS

Figure 1:
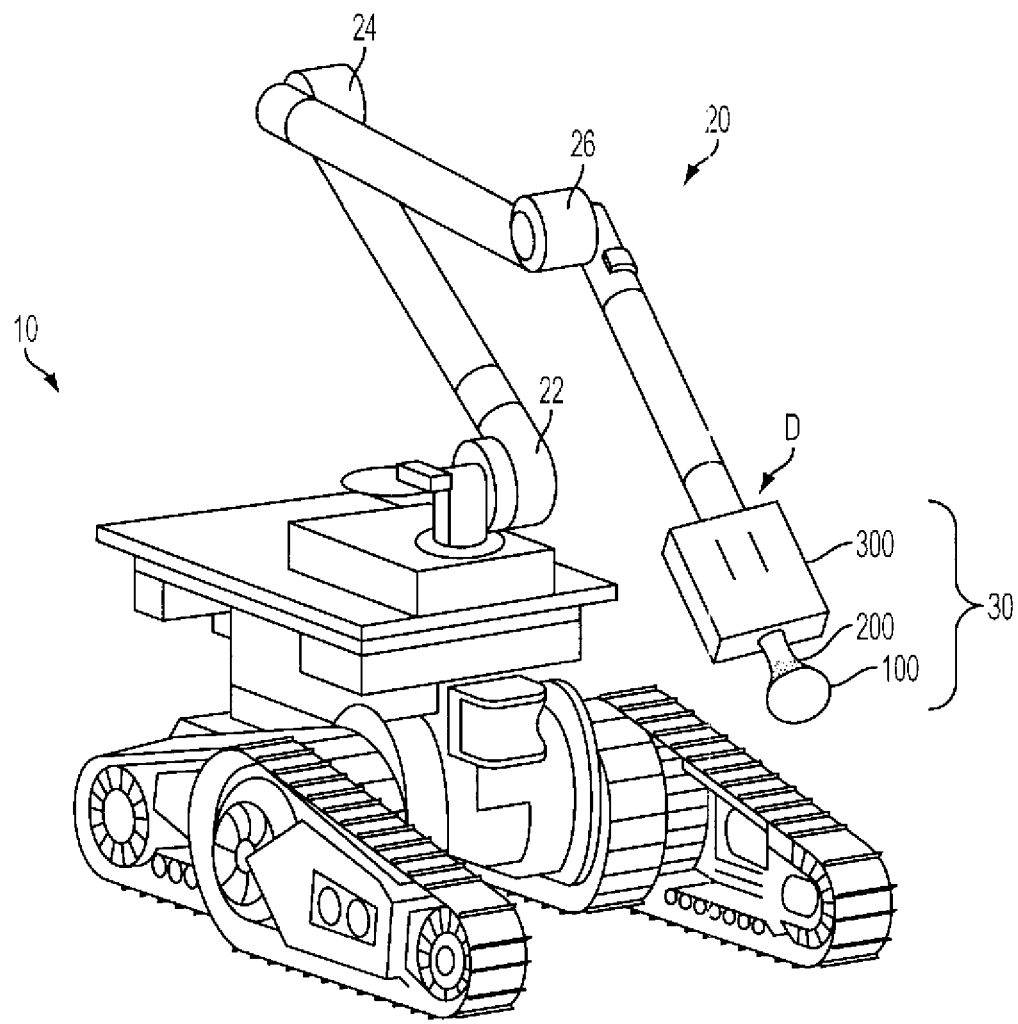
FIG. 1 is a perspective view of a remote vehicle having a manipulator arm including a manipulator in accordance with certain embodiments of the present teachings.

Reference will now be made in detail to the present teachings, exemplary embodiments of which are illustrated in the accompanying drawings.

A myriad of sensing capabilities, strength, and flexibility in the human hand make it adaptable for many applications. While roboticists have been building bio-mimetic grippers, few have come close to reproducing the human hand's capabilities. In a simpler solution, a manipulator positioned on a remote vehicle manipulator arm can deform to the target object and thereafter its rigidity can be adjusted.

In certain embodiments of the present teachings, a jamming or other phase change manipulator can be attached to a remote vehicle manipulator arm. The manipulator can include one or more housings. The housings can be substantially air-impermeable, although the composition of the housing can vary depending on the desired manipulation traits, the material contained in the housing, the size of the housing, and economic considerations. Some of the materials referred to herein may be considered by certain people of skill in the art not truly undergo a "phase change." Thus, the term "phase change materials" as used herein can comprise true phase change materials as well as material, as described herein and as would be appreciated by those skilled in the art, that behaves as if it undergoes a phase change.

The material comprising the housing(s) should be at least minimally elastic or flexible and can have some degree of friction on its surface to aid in object manipulation. The material should also have a strength (e.g., tear resistance) that is sufficient for gripping and manipulating intended objects. For example, a more tear resistant material is desirable when objects to be gripped and manipulated may have sharp edges or points, whereas tear resistance can be less critical when objects to be gripped and manipulated are smooth. In accordance with various embodiments, the housing can comprise, for example, a latex balloon, a platinum-cure or tin-cure silicone based rubber, a plastic bag such as a zip lock bag, or a Kevlar composite. Kevlar can provide strength against puncturing and can be combined with a more elastic material to attain a desired flexibility for the housing. Platinum-cure or tin-cure RTV (room temperature vulcanizing) silicone based rubbers can be desirable because they are easily molded into custom shapes.

The present teachings contemplate utilizing a high-friction material for the housing comprising, for example, soft elastomeric materials that can stretch and fold to maintain maximum surface area contact with the object to be gasped so that the friction (compressive) force applies over a large surface contact area. The high-friction material can also or alternatively comprise a material whose surface has bumps or a dense array of tendrils or hair that can help increase surface area contact. High-friction material, while not required, can increase grasp strength of the manipulator.

Housings need not comprise a single material, and can comprise a composite material, multiple layers having different compositions, or multiple panels/pieces having different compositions. Further, when multiple housings are used, the housings need not have the same composition as other housings.

The housing surrounds the jamming or other phase change material and an activation device can be placed in communication with the jamming or other phase change material. Jamming is the physical process by which some materials, such as glasses, foams, ground coffee, collections of grains, and other complex fluids, become rigid, for example with increasing density. The jamming transition has been proposed as a new type of phase transition, with similarities to a glass transition but very different from the formation of crystalline solids. While a glass transition occurs when the liquid state is cooled, the jamming transition happens for example when density is increased. This crowding of the constituent particles prevents them from exploring phase space, making the aggregate material behave as a solid. The jamming system of the present teachings preferably is able to unjam.

Regarding jamming, while many materials experience discrete liquid and solid behavior, granular matter, for example such as sand or glass particles, can easily switch between liquid and solid behavior. When a granular material such as coffee grounds is jammed, such as by vacuum packing, it becomes tightly packed and free volume is too small for the particles to move, leading to a solid-like behavior by the coffee grounds. When the vacuum seal is broken, the coffee grounds can again behave like a liquid as particles flow past one another. This gives a desirable property of selective deformability and rigidity that can be utilized for object grasping and manipulation, such as for use with a remote vehicle manipulator arm.

In accordance with the present teachings, an exemplary jamming material includes coffee grounds or structurally similar particles in air that are activated by a volume change. In addition to coffee grounds, the following other exemplary granular materials can be used for jamming: one or more of salt, glass beads, and sand can be used as jamming material when the air volume within the housing is increased/decreased to cause desired jamming behavior; glass beads and water can be used as jamming material when the water volume within the housing is increased/decreased using an appropriate pump to cause desired jamming behavior.

Other phase change materials can be used in a manipulator in accordance with the present teachings. One such material is a dilatant material such as a combination of cornstarch and water (sometimes referred to as oobleck), which can be activated to a more solid state via application of vibration. A dilatant (also called shear thickening) material is one in which viscosity increases with the rate of shear. The dilatant effect is not completely understood, but is believed to occur when closely-packed particles are combined with enough liquid to fill the gaps between them. At low velocities, the liquid acts as a lubricant, and the dilatant flows easily. At higher velocities, the liquid is unable to fill the gaps created between particles, and friction greatly increases, causing an increase in viscosity.

Other materials that are not phase change materials, but which are contemplated for use in a manipulator of the present teachings, can include electrorheological (ER) fluids and magnetorheological (MR) fluids. ER fluids are suspensions of extremely fine non-conducting particles (up to, for example, 50 micrometers in diameter) in an electrically insulating fluid. The apparent viscosity of these fluids can change reversibly by an order of up to 100,000 in response to an electrical field. An MR fluid is a suspension of micrometer-sized magnetic particles in a carrier fluid, usually a type of oil. When subjected to a magnetic field, the fluid greatly increases its viscosity, to the point of becoming a viscoelastic solid. The yield stress of the fluid when in its active ("on") state can be controlled by varying the magnetic field intensity.

Yet another phase change material can include supersaturated sodium acetate solutions that, when heated to around 100° C. and subsequently allowed to cool, become supersaturated. This solution is capable of supercooling to room temperature without forming crystals and then, by application of a small amount of energy such as a mechanical shock, a nucleation center is formed and causes the solution to crystallize into a solid sodium acetate trihydrate. Solidification is reversible through application of heat.

Devices used to actuate the phase change material will vary based on the type of material and its mode of activation. For jamming materials that exhibit change from a solid-like state to a free-flowing state (and vise versa) based on a volume change, a mechanical pump mechanism can be employed to cause a volume change and a resulting phase change. The mechanical pump mechanism can comprise, for example, a pump as described in U.S. Pat. No. 5,113,599 to Cohen et al., or an electric vacuum pump such as a Hargraves CTS Series Single Head Micro Diaphragm Pump and Compressor. In accordance with the present teachings, a volume change can also be facilitated by a fuel cell-powered vacuum pump such as that disclosed in U.S. Pat. No. 7,409,830 to Yerazunis et al.

For activating dilatant material, a low voltage, low current miniature vibrating motor can be utilized. The vibrating motor can, for example, operate on a 1-5 VDC motor with an offset weighted shaft, such as those used in cell phones and pagers for a vibrating alert signal. Electrical plates, for example one inside of the housing and one outside of the housing, can be used to activate ER material. Magnets located in or near the housing can be used to activate MR material by creating a magnetic field within the housing.

FIG. 1 illustrates an exemplary implementation of a remote vehicle having a manipulator in accordance with the present teachings. The remote vehicle can be, for example, an iRobot® Warrior®. In the exemplary embodiment illustrated in FIG. 1, the remote vehicle 10 includes a manipulator arm 20 having three joints 22, 24, 26. The manipulator arm 20 can be removably or permanently attached to the remote vehicle 10, and can include any number of joints. Each joint 22, 24, 26 can be driven by an electric motor, and the electric motors can be powered by, for example, the same power source that powers the remote vehicle 20 (e.g., its battery) or a dedicated power source (e.g., a dedicated battery). In the illustrated exemplary embodiment of FIG. 1, at a distal end D of the manipulator arm 20 is a jamming or other phase change manipulator 30 in accordance with the present teachings. The jamming or other phase change manipulator 30 can include a housing 100 including a jamming or other phase change material, a transition portion 200, and an actuating device 300. The actuating device 300 can communicate with the jamming or other phase change material in the housing via the transition portion 200. The present teachings contemplate a jamming or other phase change manipulator 30 wherein the actuating device 300 communicates directly with the housing 100 so that a transition portion 200 is not needed.

In the illustrated embodiment, the housing 100 can comprise, for example, a standard type latex balloon in which a jamming or other phase change material, for example a granular material such as coffee grounds are housed. In this single-housing embodiment, the housing 100 can have a diameter of, for example, about one inch to about four inches. The housing in the illustrated embodiment is shown to be substantially spherical, as would be understandable given that the housing comprises a standard type latex balloon. The present teachings contemplate a variety of sizes and shapes for the housing, as well as a variety of housing materials and a variety of jamming or other phase change materials as set forth above.

The transition portion 200 can include, for example, a generally conical- or funnel-shaped piece comprising plastic or other suitably strong material. The transition portion 200 facilitates communication of the actuator 300 with the housing 100 and its contents in a manner that provides a smooth and graduated surface accommodating the housing 100 in a manner to prevent wear and tear on the housing 100 that might be caused by rough or blunt edges contacting the housing 100.

In the illustrated embodiment, wherein the jamming or other phase change material in the housing 100 is coffee grounds, actuation occurs via a volume change in the housing 100. When the manipulator is unactuated, the interior of the housing can be at atmospheric pressure. By removing a sufficient amount of air from the housing 100 (which amount depends on the size of the housing and the amount of material therein) a desired vacuum level can be reached and the coffee grounds can "jam" and act as a solid. Thus, the transition portion 200 in this embodiment facilitates communication between the housing 100 and the actuator 300, allowing the actuator 100 to remove air from the housing 100 or, in some instances, allow air back into the housing 100. Thus, the transition portion can comprise a pneumatic tube or can accommodate a pneumatic tube linking the actuator with the housing. In certain embodiments, the actuator 300 can include an integral camera or a camera mounted thereon. Such a camera would allow a teleoperator of the manipulator to view the environment of the manipulator, including an object to be manipulated.

In the illustrated embodiment of FIG. 1, wherein the jamming or other phase change material comprises coffee grounds, the actuator 300 can comprise a manual pump mechanism, an electric vacuum pump, or a fuel cell-powered vacuum pump as described above.

In the embodiment illustrated in FIG. 1, the actuator 300 can be powered by a dedicated power source or a power source for the remote vehicle. The power source can be a fuel cell, such as the dedicated fuel cell described above, or one or more batteries such as, for example, Lithium Ion rechargeable batteries. The actuator 300 can have an integral power source, as described above, or can be electrically connected to its power source via electrical wires. In the exemplary embodiment illustrated in FIG. 1, the actuator 300 is powered by the remote vehicle battery (which is commonly located on the remote vehicle chassis but is not shown) and is connected thereto for example by electrical wiring (not shown) extending through an interior of the manipulator arm 20 to protect the wires from the environment.

In the embodiment illustrated in FIG. 1, the actuator 300 is located at the distal end D of the manipulator arm 20, in relatively close proximity to the housing 100. The present teachings, however, contemplate the actuator being located at a variety of locations on the remote vehicle that allow communication with the housing 100, for example on the remote vehicle chassis, within the housing 100, or within the manipulator arm 20.

Figure 2:
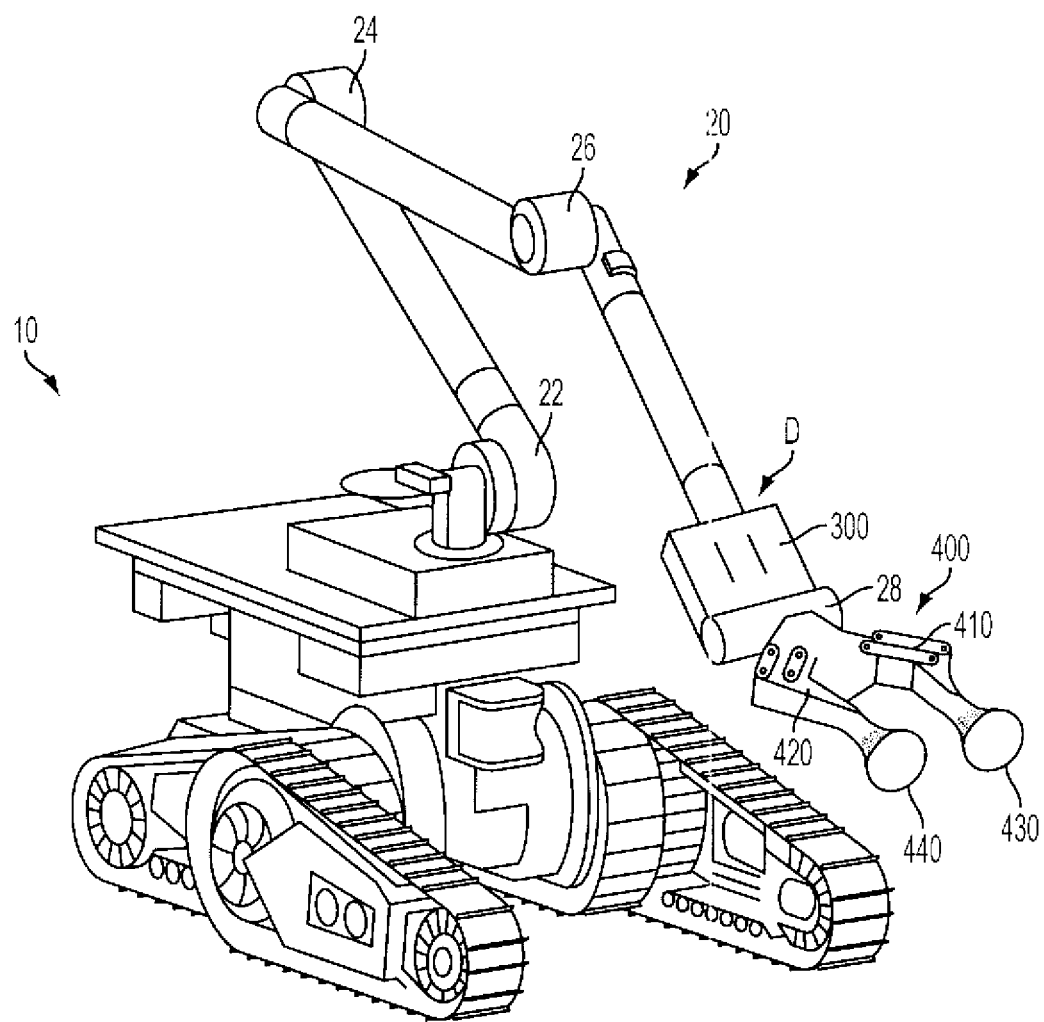
FIG. 2 is a perspective view of a remote vehicle having a manipulator arm including a manipulator in accordance with other embodiments of the present teachings.

Another exemplary embodiment of the present teachings is illustrated in FIG. 2 and includes a jamming or other phase change manipulator 400 having two fingers 410, 420, each of which has a housing 430, 440 located at a distal end thereof and filled with a jamming or other phase change material. In the illustrated embodiment, the manipulator 400 is located at a distal end D of a manipulator arm 20 having three joints 22, 24, and 26. A fourth joint 28 can be located between the actuator 300 and the manipulator 400. As stated above, the manipulator arm 20 can be removably or permanently attached to the remote vehicle 10, and can include any number of joints. Each joint 22, 24, 26, 28 can be driven by an electric motor, and the electric motors can be powered by, for example, the same power source that powers the remote vehicle 20 or a dedicated power source.

In the embodiment illustrated in FIG. 2, two jamming or other phase change manipulators 430, 440 are utilized. In certain embodiments, the manipulator housings 430, 440 can be connected with respective fingers 410, 420 and the actuator 300 via transition portions. In certain embodiments, the fingers 410, 420 can be moved toward and away from each other, allowing them to grasp objects maneuvered between them. Driving fingers of manipulator arms that are similar to the fingers illustrated in FIG. 2 without jamming or other phase change elements is known to those skilled in the art. By adding a housing 430, 440 to a distal end of each finger 410, 420, the ability of the fingers 410, 420 to grasp and hold objects is greatly increased. In certain embodiments, the actuator 300 can comprise an actuator and one or more motors for the fingers 410, 420, and can additionally include an integral camera or a camera mounted thereon. Such a camera would allow a teleoperator of the manipulator to have the environment of the manipulator, including an object to be manipulated.

In the embodiment of FIG. 2, the housings 430, 440 can comprise, for example, standard type latex balloons in which a jamming or other phase change material such as coffee grounds are housed. In this dual-housing embodiment, the housings 430, 440 can have a diameter of, for example, from about a few millimeters to an inch or more. The housings 430, 440 in the illustrated embodiment are shown to be substantially spherical, as would be understandable given that the housings comprise a standard type latex balloon. The present teachings contemplate a variety of sizes and shapes for the housings, as well as a variety of housing materials and a variety of jamming or other phase change materials as set forth above. The housings 430, 440 need not have the same size or shape as each other and need not comprise the same material as each other. Indeed, the housings 430, 440 need not be filled with the same jamming or other phase change material, although it can be desirable to use material that can be actuated by the same type of actuator in each housing, so that a single actuator can be provided for both housings 430, 440.

Transition portions, if utilized, can include, for example, generally conical- or funnel-shaped pieces comprising plastic or other suitably strong material. Transition portions can facilitate communication of the actuator 300 with the housings 430, 440 and their contents (via fingers 410, 420) in a manner that provides a smooth and graduated surface accommodating the housings 430, 440 in a manner to prevent wear and tear on the housings 430, 440 that might be caused by rough or blunt contacting the housings 430, 440. In the illustrated embodiment, wherein the jamming or other phase change material in the housings 430, 440 is coffee grounds, actuation occurs via a volume change in each of the housings 430, 440. When unactuated, the housings 430, 440 can be at atmospheric pressure. By removing a sufficient amount of air from each of the housings 430, 440 (which amount depends on the size of the housing and the amount of material therein) a desired vacuum level can be reached and the coffee grounds in the housings can "jam" and act as a solid. Each transition portion can comprise a pneumatic tube or can accommodate a pneumatic tube linking the actuator with the housing. In certain embodiments, the actuator 300 can communicate with each of the housings 430, 440 via a pneumatic tube connecting each of the housings 430, 440 to the actuator 300 via a respective finger 410, 420.

In the illustrated embodiment of FIG. 2, wherein the jamming or other phase change material comprises coffee grounds, the actuator 300 can comprise one or more manual pump mechanisms, electric vacuum pumps, or fuel cell-powered vacuum pumps as described above.

In the embodiment illustrated in FIG. 2, the actuator 300 can be powered by a dedicated power source or a power source for the remote vehicle. The power source can be a fuel cell, such as the dedicated fuel cell described above, or one or more batteries such as Lithium Ion rechargeable batteries. The actuator 300 can have an integral power source, as described above, or can be electrically connected to its power source via electrical wires. In the exemplary embodiment illustrated in FIG. 2, the actuator 300 is powered by the remote vehicle battery (which is commonly located on the remote vehicle chassis but is not shown) and is connected thereto for example by electrical wiring (not shown) extending through an interior of the manipulator arm 20 to protect the wires from the environment.

In the embodiment illustrated in FIG. 2, the actuator is located at the distal end D of the manipulator arm 20, in relatively close proximity to the housings 430, 440. The present teachings, however, contemplate the actuator 300 being located at a variety of locations on the remote vehicle that allow communication with the housings 430, 440, for example on the remote vehicle chassis, within the housings 430, 440, or within the manipulator arm 20.

Figure 3:
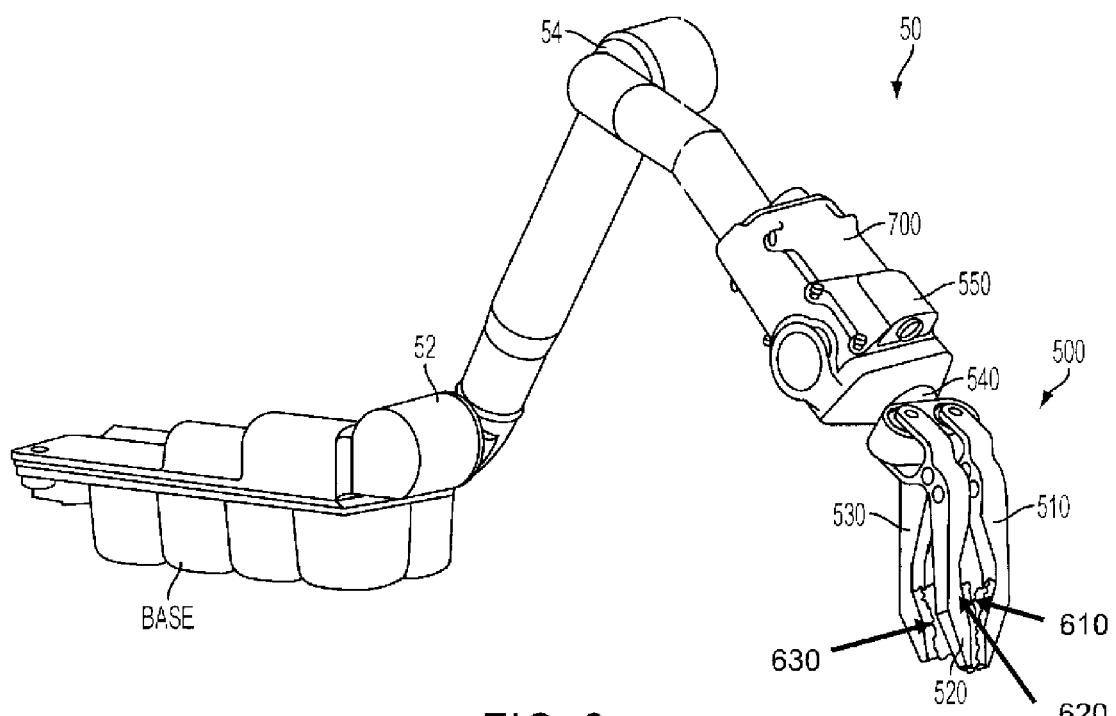
FIG. 3 is a perspective view of a manipulator arm payload having a manipulator in accordance with yet other embodiments of the present teachings.

In the embodiment illustrated in FIG. 3, the jamming or other phase change manipulator 500 comprises three cooperating fingers 510, 520, 530. In certain embodiments, each of the fingers 510, 520, 530 include manipulator housings 610, 620, 630 connected with an actuator 700, perhaps via transition portions (not shown) such as those illustrated in FIGS. 1 and 2. Each housing 610, 620, 630 is associated with a respective finger 510, 520, 530. In certain embodiments, the housings 610, 620, 630 are located on an inner surface of respective fingers 510, 520, 530, and in certain embodiments the housings 610, 620, 630 extend to the distal ends of respective fingers 510, 520, 530. The fingers 510, 520, 530 can move toward and away from each other, allowing them to grasp objects maneuvered therebetween. Methods and systems for controlling gripper fingers of manipulator arms are generally known to those skilled in the art. By adding a housing 610, 620, 630 to an inner surface of each finger 510, 520, 530, the ability of the fingers to grasp and hold objects is greatly increased. In certain embodiments, the fingers 510, 520, 530 can pivot in one or more directions about the axis of the manipulator arm 50 via, for example, a pivot joint 540.

In the embodiment of FIG. 3, the housings 610, 620, 630 can comprise, for example, standard type latex balloons in which a jamming or other phase change material such as coffee grounds are housed. The size of each housing 610, 620, 630 in this three-housing embodiment can vary with the size of its respective finger 510, 520, 530. Each housing 610, 620, 630 in the illustrated embodiment is shown to be complementary to its respective finger. The present teachings contemplate a variety of sizes and shapes for the housings, as well as a variety of housing materials and a variety of jamming or other phase change materials as set forth above. The housings 610, 620, 630 need not have the same size or shape as each other and need not comprise the same material as each other. Indeed, the housings 610, 620, 630 need not be filled with the same material, although it can be desirable to use material that can be actuated by the same type of actuator in each housing, so that a single actuator can be provided for all three housings 610, 620, 630. In certain embodiments, the actuator 700 comprises an actuator and a motor for the fingers, and can additionally include an integral camera or a camera 550 mounted thereon. Such a camera 550 would allow a teleoperator of the manipulator to view the environment of the manipulator, including an object to be manipulated.

Transition portions, if utilized, can include generally conical- or funnel-shaped pieces comprising plastic or other suitably strong material. Transition portions can facilitate communication of the actuator 700 with the housings 610, 620, 630 and their contents in a manner that provides a smooth and graduated surface accommodating the housings 610, 620, 630 in a manner to prevent wear and tear on the housings that might be caused by rough or blunt contacting the housings. In the illustrated embodiment, wherein the jamming or other phase change material in the housings 610, 620, 630 is coffee grounds, actuation occurs via a volume change in each of the housings 610, 620, 630. When unactuated, the housings can be at atmospheric pressure. By removing a sufficient amount of air from each of the housings 610, 620, 630 (which amount depends on the size of the housing and the amount of material therein) a desired vacuum level can be reached and the coffee grounds in the housings can "jam" and act as a solid. Each transition portion can comprise a pneumatic tube or can accommodate a pneumatic tube linking the actuator with the housing. In certain embodiments, the actuator 700 can communicate with each of the housings 610, 620, 630 via a pneumatic tube connecting each of the housings 610, 620, 630 to the actuator 700.

In the illustrated embodiment of FIG. 3, wherein the jamming or other phase change material comprises coffee grounds, the actuator 700 can comprise one or more manual pump mechanisms, electric vacuum pumps, or fuel cell-powered vacuum pumps as described above.

In the embodiment illustrated in FIG. 3, the actuator 700 can be powered by a dedicated power source or a power source for the remote vehicle. The power source can be a fuel cell, such as the dedicated fuel cell described above, or one or more batteries such as Lithium Ion rechargeable batteries. The actuator 700 can have an integral power source, as described above, or can be electrically connected to its power source via electrical wires. In the exemplary embodiment illustrated in FIG. 3, the actuator 700 and the manipulator arm are part of a payload that can be removably attached to a remote vehicle chassis (not shown). In such an embodiment, the actuator 700 can be powered by the power source of the remote vehicle, a dedicated power source for the payload, or a dedicated power source for the manipulator. The actuator can be connected to the remote vehicle battery (which is commonly located on the remote vehicle chassis but is not shown) for example by electrical wiring (not shown) extending through an interior of the manipulator arm 50 to protect the wires from the environment.

In the embodiment illustrated in FIG. 3, the actuator 700 is located at the distal end D of the manipulator arm 50, in relatively close proximity to the housings 610, 620, 630. The present teachings, however, contemplate the actuator 700 being located at a variety of locations on the remote vehicle that allow communication with the housings 610, 620, 630, for example on the payload base, on the remote vehicle chassis, within the housings 610, 620, 630, or within the manipulator arm 50.

In accordance with certain embodiments, the present teachings contemplate that the entire housing need not be filled with a jamming or other phase change material. Indeed, the housing can comprise/contain other materials selected to facilitate or enhance manipulation, for example for specific tasks for which a manipulator is designed. The other materials contained within the housing can include a shaped object allowing the housing to maintain a given orientation or shape during a phase change.

Figure 4A:
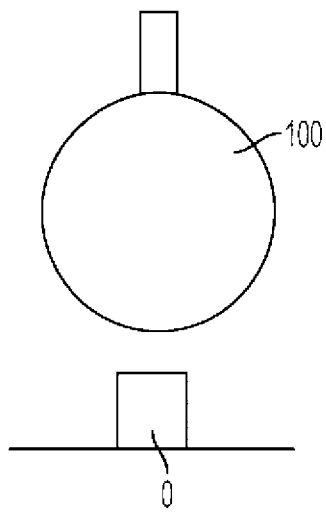
FIGS. 4A-4D illustrate, schematically, an exemplary embodiment of object grasping and manipulation in accordance with the present teachings, wherein a manipulator consistent with the embodiment of FIG. 1 picks up an object.
Figure 4B:
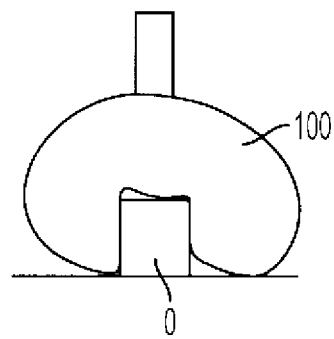
Figure 4C:
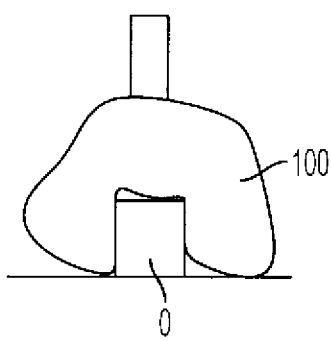
Figure 4D:
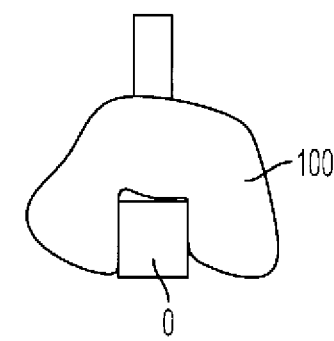

In an exemplary method for using the device, as illustrated in the schematic diagrams of FIGS. 4A-4D for a manipulator consistent with the embodiment shown in FIG. 1 and including coffee grounds as the jamming or other phase change material in the housing 100, the housing 100 can be held at atmospheric pressure such that the jamming material can flow in a liquid-like manner, making the manipulator pliable as shown in FIG. 4A. The housing 100 can then be pressed onto an object O to be manipulated, such that it at least begins to conform to a shape of the object O, thus at least beginning to surround it as shown in FIG. 4B. Air can then be evacuated from the housing 100 via the actuator 300 (not shown in the schematic of FIGS. 4A-4D), creating a negative pressure within the housing 100 that decreases the housing's volume so that the coffee grounds become packed tightly together and behave in certain aspects as a solid, making the manipulator 30 rigid as it is conforming with a shape of the object O as shown in FIG. 4C. Depending on the shape and composition of the housing, the housing material can shrink a small amount due to evacuation of volume in the housing, creating a slight compressive force on the object to be grasped. This compressive force is the normal force necessary for friction to allow grasping and manipulation of the object. The object O is then held tightly (i.e., grasped) by the housing 100 and can be manipulated by the remote vehicle via the housing 100, for example by being lifted by the housing 100 as show in FIG. 4D.

Figure 5A:
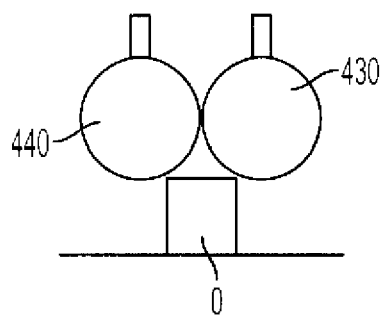
FIGS. 5A-5D illustrate, schematically, an exemplary embodiment of object grasping and manipulation in accordance with the present teachings, wherein a manipulator consistent with the embodiment of FIG. 2 picks up an object.
Figure 5B:
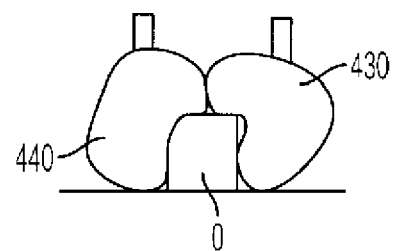
Figure 5C:
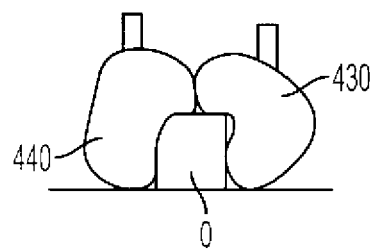
Figure 5D:
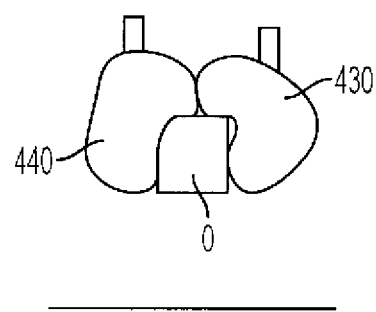

In another exemplary method for using the device, as illustrated in the schematic diagrams of FIGS. 5A-5D for a manipulator consistent with the embodiment 400 shown in FIG. 2 and including coffee grounds as the jamming or other phase change material in the housings 430, 440, the housings 430, 440 can be held at atmospheric pressure such that the jamming material can flow in a liquid-like manner, making the manipulator pliable as shown in FIG. 5A. The housings 430, 440 can then be pressed onto an object O to be manipulated, such that they at least begin to conform to a shape of the object O, thus at least beginning to surround it as shown in FIG. 5B. Air can then be evacuated from the housings via the actuator (not shown in the schematic of FIGS. 5A-5D), creating a negative pressure within the housings 430, 440 that decreases the housings' volume so that the coffee grounds become packed tightly together and behave in certain aspects as a solid, making the manipulator 400 rigid as it is conforming with a shape of the object O as shown in FIG. 5C. The object O is then held tightly by the housings 430, 440 and can be manipulated by the remote vehicle via the housings 430, 440, for example by being lifted by the housings 430, 440 as show in FIG. 5D.

In an embodiment of the present teachings employing three housings, such as the exemplary embodiment of FIG. 3, manipulation of an object can be accomplished in accordance with the methods described above with respect to FIGS. 4A-4D and FIGS. 5A-5D. Manipulation of an object O, such as by lifting the object O can be accomplished by controlling the manipulator arm as would be understood by those skilled in the art.

In certain embodiments of the present teachings, the jamming material in the housing(s) can be activated to varying degrees to adjust the stiffness of the manipulator.

To release the object O from housing(s) such as those filled with coffee grounds for jamming, air can be pumped or allowed back into the housing(s), allowing the interior of the housing(s) to return to atmospheric pressure such that the jamming material can flow in a liquid-like manner again.

With reference to the device of FIG. 1 and the teachings described herein, instead of trying to precisely align and place multiple gripper fingers on or around an object to grasp the object, an operator need only press or place the housing 100 on the object and actuate the manipulator. Thus, precise positioning and complex, high degree-of-freedom grippers are not needed to manipulate even small objects such as pencils or complex objects such as door knobs.

The embodiments of the present teachings described in accordance with the schematics illustrated in FIGS. 4A-4D and 5A-5D are exemplary only. The size and shape of each manipulator can vary to optimize the manipulator for an intended use, or for reasons of durability or economy. In addition, the resting pliability of the manipulator can vary, which can vary the manipulator's ability to surround the object to be manipulated when at rest or unactuated. For jamming via volume change, the manipulator can be at rest when the housing is at atmospheric pressure and is pliable to conform to the shape of an object. The housing is activated by fluid (e.g., air) evacuation, making the housing rigid to grip the object. For jamming via introduction of an electric or magnetic field with, for example, a device such as a battery or other power source that can be switched on and off, the manipulator can be at rest when no electric current or no magnetic field is applied to the jamming material.

Figure 11A:
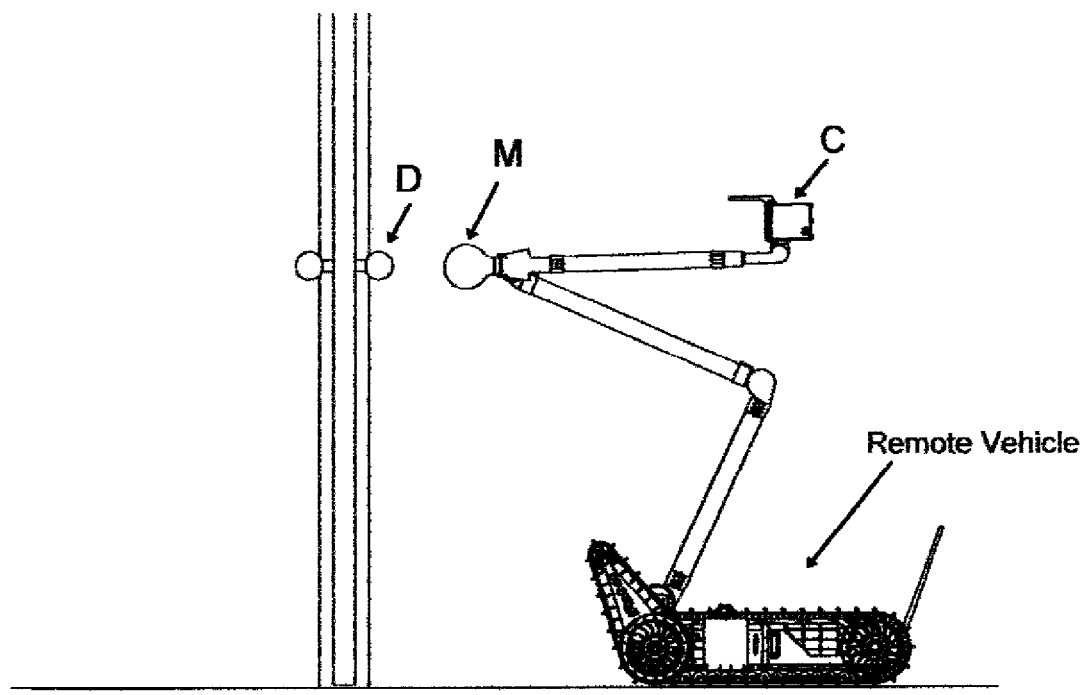
FIGS. 11A-11C illustrate an exemplary embodiment of a remote vehicle opening a door using a manipulator in accordance with the present teachings.
Figure 11B:
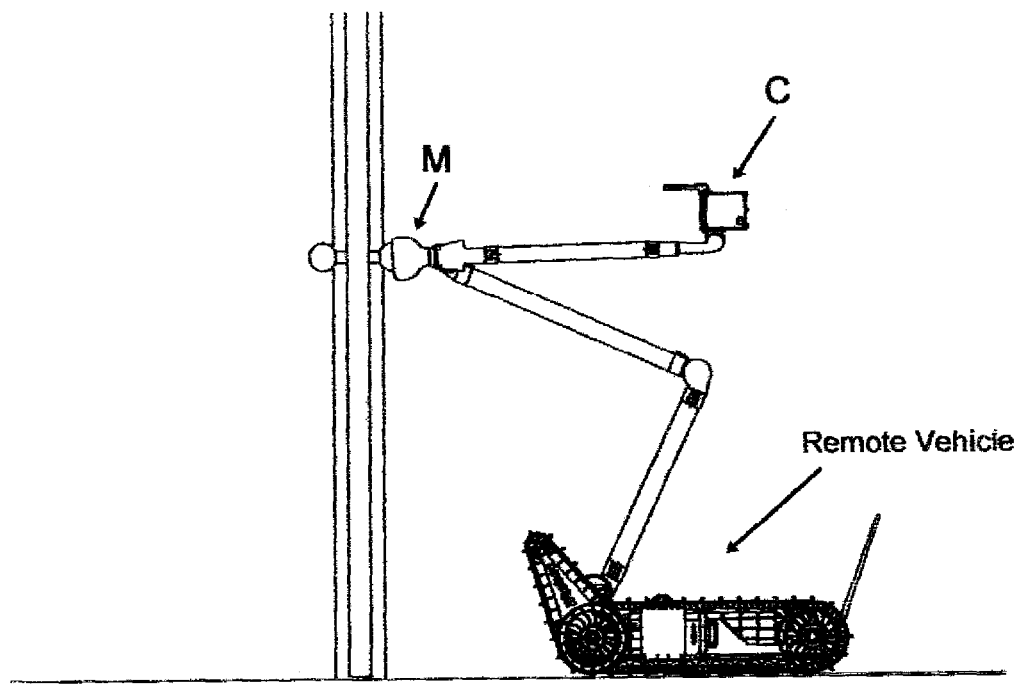
Figure 11C:
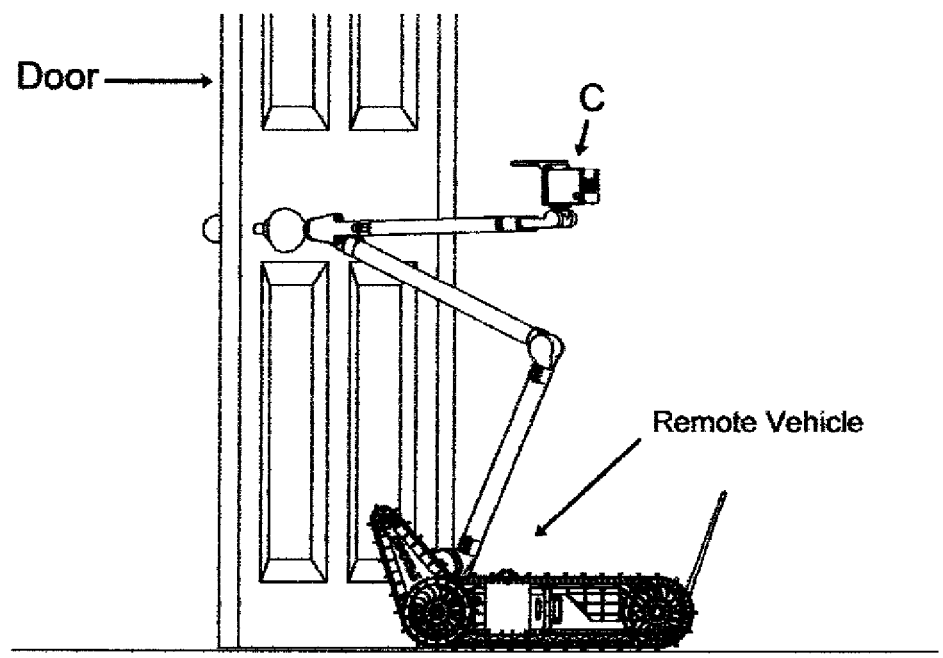

In certain embodiments, a manipulator in accordance with the present teachings can be used to open a door in the following manner, as illustrated in FIGS. 11A-11C. First, an unactuated manipulator is pressed against the door knob, deforming to a certain degree to accommodate a shape of the door knob. Next, the jamming or other phase change material is actuated, making the material behave as a solid that is grasping the door knob. Next, the manipulator is rotated in a manner to rotate the door knob, via, for example, a pivot joint such as the pivot joint 540 disclosed in FIG. 3. Once the door is unlatched by rotating the door knob, the door knob can be moved as necessary to open the door. Pulling or pushing of the door knob is accomplished by moving the manipulator in an appropriate direction (e.g., forward and backward) with the manipulator arm and/or by displacement of the remote vehicle.

The present teachings contemplate using the manipulator of the present teachings to grasp and rotate a variety of door handle types, including a lever-type of door handle. Also, similar to the way a door knob can be grasped, rotated, and pulled or pushed, a manipulator in accordance with the present teachings can grasp an object and rotate, tow, or plow the object.

In addition to the embodiments and methodology described above for improved object manipulation, the present teachings contemplate providing or integrating pressure sensors in or on the housing, along with a strain-sensing material composition for the housing, for determining how the housing's shape changes upon being placed/pressed onto an object. Recognizing a change in housing shape can facilitate determination of a certain amount of the 3D geometry of the object being grasped in a manner known to those skilled in the art. Determining a certain amount of the 3D geometry of the object being grasped can assist an operator in determining whether the manipulator has a suitable grasp on an object, and/or how best to grasp and move the object. As an example, knowing the object geometry can assist the operator in determining whether an object extends beyond the manipulator and where the object's center of mass is, which can be useful knowledge for manipulating the object.

Figure 6:
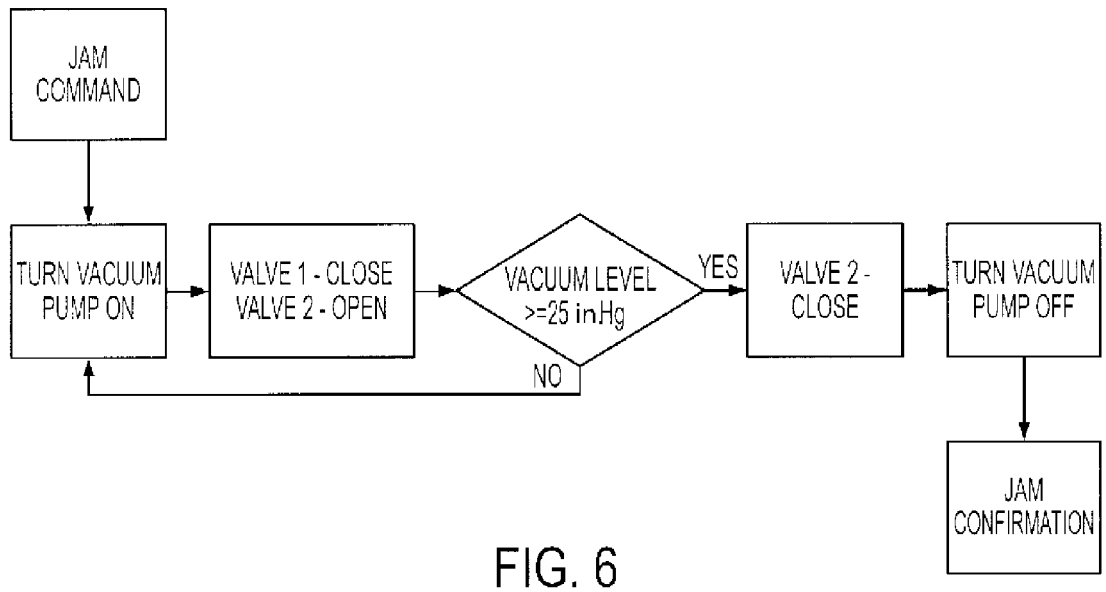
FIG. 6 is a flow chart illustrating an exemplary jamming process in accordance with the present teachings.

FIG. 6 is a flow chart illustrating an exemplary jamming process in accordance with the present teachings, wherein the jamming or other phase change material comprises coffee grounds or another material that exhibits a solid-like behavior upon evacuation of air or another fluid with which it is combined. Jamming can be initiated with a jam command received, for example, by the remote vehicle controller from, for example, an operator control unit. Transmission, receipt, and implementation of such a command can be accomplished in a manner similar to transmission, receipt, and implementation of other teleoperation commands. Upon receipt of the jam command, a vacuum pump (see FIG. 8) can be turned on and a valve (e.g., Valve 1 in FIG. 8) connecting the housing to a low pressure vent can be closed to allow evacuation of air or other fluid from the housing to cause jamming. A low pressure vent can return the housing to an atmospheric pressure, thereby unjamming the material. The present teachings do not require use of a low pressure vent, although use of such a vent can allow the housing interior to return to atmospheric pressure more quickly. To unjam the material in the absence of a low pressure vent, a valve can merely connect the housing with the surrounding environment.

In the exemplary embodiment of FIG. 6, the vacuum pump only turns on if the vacuum level in the housing is less than 25 in. Hg. This is because, if the vacuum level in the housing is greater than or equal to 25 in. Hg, the housing already has the desired level of vacuum for this embodiment. If turned on, the vacuum pump is kept on until the vacuum level in the housing becomes equal to or greater than 25 in. Hg. Pressure in the housing is measured, for example, by a pressure sensor within or otherwise connected to the housing (see FIG. 8). When the pressure sensor indicates that the pressure in the housing is greater than or equal to 25 in. Hg, a valve connecting the vacuum pump with the housing can be closed to retain the desired pressure in the housing and the vacuum pump can be turned off. Jamming is "confirmed" when a desired pressure in the housing (e.g., 25 in. Hg) is indicated by the pressure sensor. Confirmation can be sent to the operator via a signal to the operator control unit. The rate of evacuation of air from the housing can be dependent upon the pump being used. In certain embodiments, evacuation to a vacuum level of 25 in. Hg can occur in a second or less, for example in a housing having a diameter of less than five inches.

Figure 7:
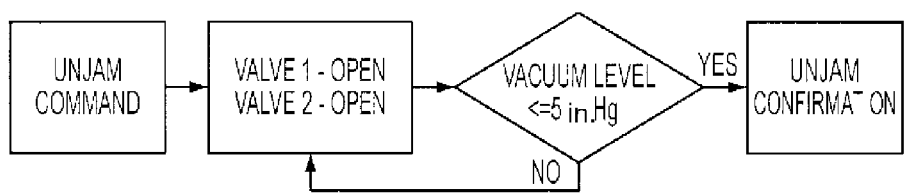
FIG. 7 is a flow chart illustrating an exemplary unjamming process in accordance with the present teachings.

FIG. 7 is a flow chart illustrating an exemplary unjamming process in accordance with the present teachings, wherein the jamming or other phase change material comprises coffee grounds or another material that exhibits a solid-like behavior upon evacuation of air or another fluid with which it is combined. Unjamming is initiated with an unjam command that is received, for example, by the remote vehicle controller from, for example, an operator control unit. Transmission, receipt, and implementation of such a command can be accomplished in a manner similar to transmission, receipt, and implementation of other teleoperation commands. Upon receipt of the unjam command, a valve (e.g., Valve 1 in FIG. 8) can be opened, connecting the housing with the low pressure vent to allow an exchange of air or other fluid with the housing to cause the housing to return to an unjammed state, for example atmospheric pressure when coffee grounds are used as a jamming or other phase change material. The low pressure vent can provide controlled access to the external environment or another non-vacuum environment. In the exemplary embodiment of FIG. 7, when the vacuum level in the housing is less than or equal to 5 in. Hg, unjamming of the manipulator can be confirmed. The valve leading to the low pressure vent need not, however, be closed upon confirmation of unjamming. Unjamming is "confirmed" when a desired pressure in the housing (e.g., 5 in. Hg) is indicated by the pressure sensor. Confirmation can be sent to the operator via a signal to the operator control unit.

Figure 8:
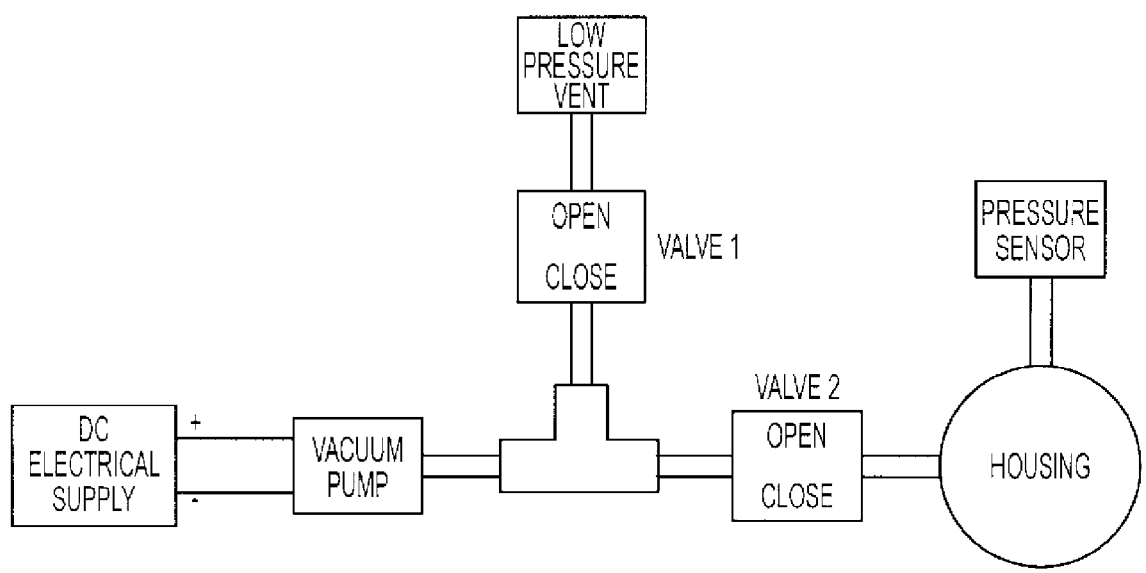
FIG. 8 is a schematic diagram illustrating an exemplary embodiment of various components used for manipulation via volume-change jamming or other phase change solidification in accordance with the present teachings.

FIG. 8 is a schematic diagram illustrating an exemplary embodiment of various components used for manipulation via volume-change jamming or other phase change solidification in accordance with the present teachings. As shown, a vacuum pump is powered by a DC electrical supply and connected (e.g., via pneumatic tubing) with the housing. Also connected with the housing (e.g., via pneumatic tubing) is a low pressure vent that can, in certain embodiments, be employed to control access to the external environment or another non-vacuum environment. A valve (Valve 1) can be provided between the low pressure vent and the housing. Valve 1 can have opened and closed positions. Another valve (Valve 2) can be provided between the housing and both the vacuum pump and the low pressure vent. When Valve 1 and Valve 2 are open, the housing can be held at atmospheric pressure such that the jamming or other phase change material can flow in a liquid-like manner, making the manipulator pliable. When Valve 1 is closed and Valve 2 is open and the vacuum pump is turned on, the vacuum pump can remove air from the housing making the jamming or other phase change material behave as a solid. Closing Valve 2 can allow, for a housing without leakage, the housing to remain jammed indefinitely.

Regarding the 25 in. Hg and 5 in. Hg vacuum levels, these levels are exemplary only, as jamming and most other phase changes don't turn "on" and "off," but rather the modulus of the material varies—sometimes nearly linearly—with the vacuum level. Thus, the vacuum levels selected for jamming and unjamming for a given implementation will be chosen based on a desired pliability and stiffness of the housing.

Figure 9:
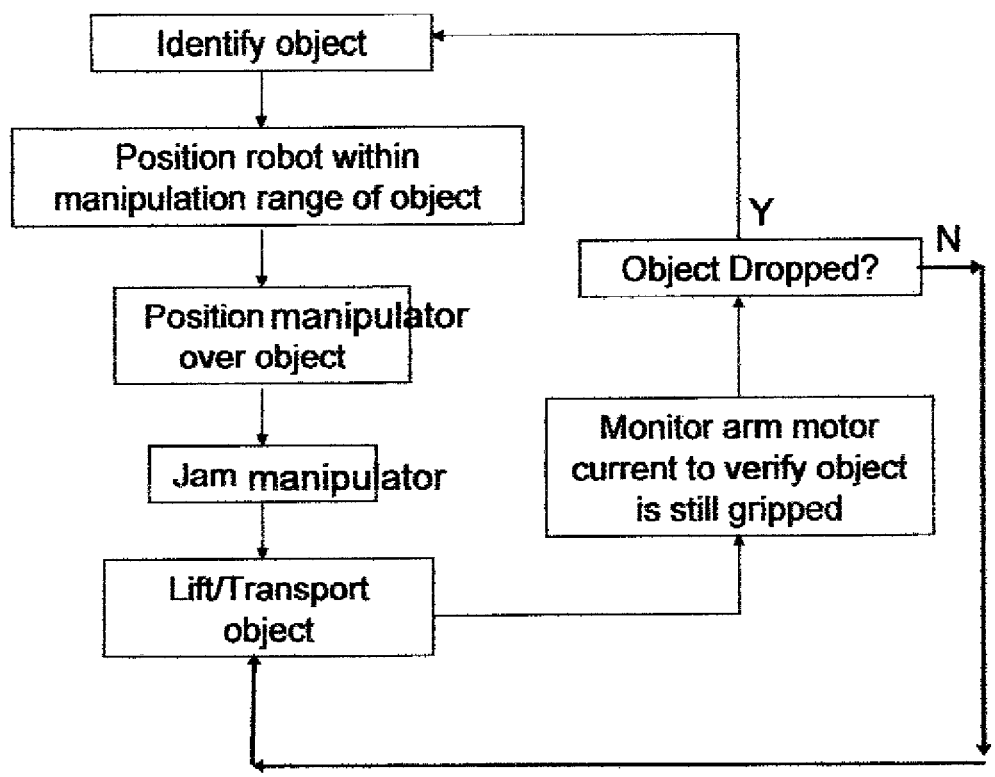
FIG. 9 is a flow chart illustrating exemplary remote vehicle behaviors utilized in grasping and transporting an object with a manipulator in accordance with the present teachings.

FIG. 9 is a flow chart illustrating exemplary remote vehicle behaviors utilized in grasping and transporting an object with a manipulator in accordance with certain embodiments of the present teachings. Initially, an "identify object" behavior is utilized to identify, to a given extent, the object to be manipulated. For door breaching, this can be done with an available model of the handle to be opened and a known map of the work area. It can alternatively be done using a 2D sliding window classifier and a supervised learning algorithm with 2D camera data combined with 3D laser scans. The supervised learning algorithm can also provide an axis of rotation of the knob and its turning direction, and is described in more detail in Klingbeil et al., *Learning to Open New Doors*, Stanford University Computer Science Department, the disclosure of which is incorporated herein by reference in its entirety.

After the object is identified, the remote vehicle is positioned within a manipulation range of the object, for example by a teleoperator controlling the remote vehicle. The positioning behavior can employ certain semi-autonomous sub-behaviors, such as click-to-drive and obstacle avoidance behaviors. Next, the manipulator can be positioned over or proximate the object and then pressed against the object to conform to the object's shape. This behavior can utilize, e.g., a semi-autonomous behavior similar to a click-to-grip behavior. Upon proper positioning, the manipulator can be jammed to cause the jamming or other phase change material within the housing to behave as a solid and grasp the object. Upon jamming, the manipulator arm and/or the remote vehicle can be moved to transport the object, for example via teleoperation. Thereafter, grasping of the object can be verified, for example by monitoring the current to the manipulator arm to confirm that a constant load is applied to the arm (i.e., that the arm continues to carry the load of the grasped object). If the object has been dropped, the object can again be identified and the grasping and transport repeated.

Figure 10:
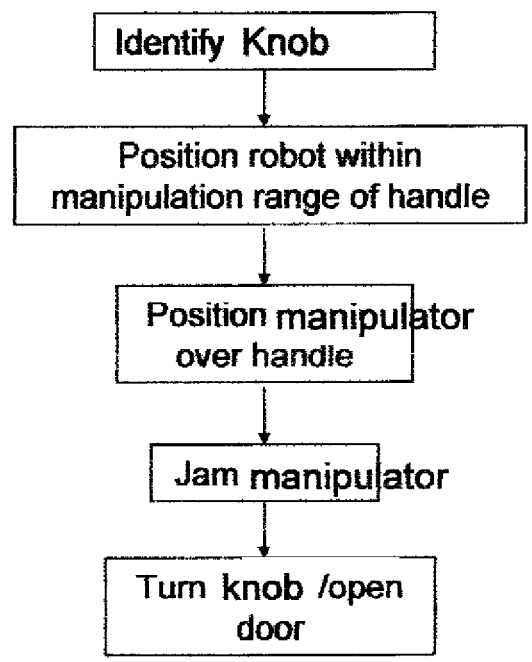
FIG. 10 is a flow chart illustrating exemplary remote vehicle behaviors utilized in grasping and turning a door knob with a manipulator in accordance with the present teachings.

FIG. 10 is a flow chart illustrating exemplary remote vehicle behaviors utilized in grasping and turning a door knob with a manipulator in accordance with certain embodiments of the present teachings. Initially, an "identify object" behavior (as discussed above) is utilized to identify the door knob to be manipulated. Thereafter, the remote vehicle is positioned within a manipulation range of the door knob, for example by a teleoperator controlling the remote vehicle. The positioning behavior can employ certain semi-autonomous sub-behaviors, such as click-to-drive and obstacle avoidance behaviors. Next, the manipulator can be positioned over or proximate the door knob and then pressed to it to conform to a shape of the object. This behavior can utilize, e.g., a semi-autonomous behavior similar to a click-to-grip behavior. Upon proper positioning on the door knob, the manipulator can be jammed to cause the jamming or other phase change material within the housing to behave as a solid and grasp the door knob. Upon jamming, the manipulator arm and/or the remote vehicle can be rotated to turn the door knob, for example via teleoperation. Although not illustrated, similar to the behavior flow chart illustrated in FIG. 9, if the manipulator loses its grip on the door knob (which can be determined, for example, by a teleoperator viewing the knob or by tracking current to a motors controlling rotation of the door knob), the door knob can again be identified and the rotation repeated.

As stated above, FIGS. 11A-11C illustrate an exemplary embodiment of a manipulator consistent with the embodiment of FIG. 1 being utilized to open a door in accordance with certain embodiments of the present teachings. In FIG. 11A, the remote vehicle approaches a door having a door knob D. As can be seen, in the remote vehicle embodiment depicted, a camera or other viewing device C allows a teleoperator (or behavioral software) to "see" the environment of the manipulator M to guide the manipulator M toward the door knob. In FIG. 11B, the manipulator housing is pressed to the door knob D, conforming at least partially to its shape, and the jamming or other phase change material is activated to act as a solid, causing the manipulator M to grasp the door knob D. The door knob can then be rotated by the manipulator M to unlatch the door. After the door has been unlatched by rotating the door knob, the remote vehicle and/or the manipulator arm can be moved (see FIG. 11C) to pull or push the door into an open position.

Regarding the rotational force necessary to rotate a door knob to unlatch a door, in accordance with certain embodiments, the manipulator can be capable of applying a torque of, for example, between 0.5 ft-lb and 1.5 ft-lb of torque. However, as will be understood by those skilled in the art, the present teachings contemplate utilizing a broader range of torques as necessary for a given application and/or for varied types of knobs.

Utilizing a remote vehicle equipped with a manipulator embodiment in accordance with the present teachings need not substantially change the main manipulation tasks of missions executed by such a remote vehicle, for example an IED disposal mission. Utilization of the manipulator would simply make the task of object manipulation during the mission faster and less complex. It should be noted that, with prior art remote vehicles having conventional grippers, the general approach direction of the grippers is important to ensure that the remote vehicle's manipulator arm has a proper range of motion to swing the door open as necessary after unlatching the door knob. However, when utilizing a manipulator in accordance with the present teachings, the direction of approach is not as important, because the manipulator can conform to the handle or maximize surface contact with the object so long as the housing(s) overlap sufficiently with the knob so that the housing(s) can sufficiently grip the door knob when jammed and apply the required amount of torque to unlatch the door knob.

The present teachings also contemplate a controller, and utilization thereof, for controlling a manipulator to be used on a manipulator arm of a remote vehicle to manipulate an object. Certain embodiments of the controller can facilitate manual control of the manipulator, providing proportional haptic feedback (e.g., a vibration felt by the operator) when the manipulator touches the object. The controller can also provide a second haptic feedback indicative of sufficient grasping of the object by the manipulator. The second feedback can comprise, for example, pressure against the operator's hand or other physical feedback that can be understood by the controller to indicated that the manipulator has jammed or is sufficiently grasping an object. Such haptic feedback can include, for example, constriction of the controllers hand, wrist, or finger in a manner that suggests the manipulator's gripping.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for grasping an object with a remote vehicle having a camera and a manipulator attached to a manipulator arm, the method comprising:
    locating the object and the manipulator within the field of view of the camera;
    pressing the manipulator housing to the object;
    activating a granular jamming phase change material in a housing of the manipulator to switch form a liquid behavior to solid behavior to cause the manipulator to grasp the object by evacuating air from the manipulator housing to change a fluid volume in the manipulator housing, wherein, prior to activating the jamming material, an interior of the housing is at atmospheric pressure and the manipulator is pliable; and
    moving one or more of the manipulator arm and the remote vehicle to manipulate the object.

2. The method of claim 1, wherein the jamming phase change material is a granular material.

3. The method of claim 1, wherein, after activating the jamming phase change material, the interior of the housing is at a negative pressure and the manipulator is rigid.

4. The method of claim 1, wherein the housing comprises a balloon.

5. The method of claim 1, wherein the housing comprises a high-friction material.

6. The method of claim 1, wherein the housing comprises a flexible or elastic material.

7. The method of claim 1, wherein the object is a door knob or door handle and manipulating the object comprises actuating the door knob or door handle to open a door to which the door knob or door handle are attached.

8. A system for use with a remote vehicle and allowing the remote vehicle to manipulate an object, the system comprising:
    a manipulator arm having a proximal end and a distal end, and being attached to the remote vehicle at the proximal end;
    a manipulator located at the distal end of the manipulator arm and comprising a housing and a granular jamming phase change material within the housing, wherein, prior to activating the jamming material, an interior of the housing is at atmospheric pressure and the manipulator is pliable;
    a camera mounted on the remote vehicle at a known position with respect to the manipulator arm; and
    a vacuum in fluid communication with the interior of the housing, the vacuum changing a vacuum level in the housing for activating the jamming material;
    wherein, to manipulate the object, the object and the manipulator are located within the field of view of the camera and the object is manipulated by moving the manipulator arm to press the manipulator housing to the object, activating the jamming material to switch form a liquid behavior to solid behavior to cause the manipulator to grasp the object, by evacuating air from the manipulator housing to change a fluid volume in the manipulator housing, and moving one or more of the manipulator arm and the remote vehicle.

9. The system of claim 8, wherein the jamming material is coffee grounds.

10. The system of claim 8, wherein the housing comprises a balloon.

11. The system of claim 8, wherein the housing comprises a platinum-cure or tin-cure silicone-based rubber.

12. The method of claim 8, wherein the object is a door knob or door handle and manipulating the object comprises actuating the door knob or door handle to open a door to which the door knob or door handle are attached.

13. A method for using a remote vehicle having a camera attached to a manipulator arm and a manipulator attached to the manipulator arm to open a door having a knob, the method comprising:
    locating the object and the manipulator within the field of view of the camera;
    actuating the manipulator arm to press the manipulator to the knob;
    activating a granular jamming phase change material in a housing of the manipulator to switch form a liquid behavior to solid behavior to cause the manipulator to grasp the knob by evacuating air from the manipulator housing to change a fluid volume in the manipulator housing, wherein, prior to activating the jamming material, an interior of the housing is at atmospheric pressure and the manipulator is pliable;
    rotating the manipulator arm and thus the knob to unlatch the door; and
    moving one or more of the manipulator arm and the remote vehicle to pull or push the door.

14. The method of claim 13, wherein the manipulator comprises more than one housing.

15. The method of claim 14, wherein each of the housings is provided on a finger of a gripper.

16. The method of claim 15, wherein actuating the manipulator arm to press the jamming manipulator housing to the knob comprises:
    positioning the fingers of the manipulator so that they are on substantially opposite sides of the knob; and
    pressing the fingers of the manipulator onto the knob so that the housings conform at least partially to a shape of the knob.

17. A manipulator and a camera to be used on a manipulator arm of a remote vehicle, the manipulator comprising a housing filled with a granular jamming phase change material,
    wherein the camera and the manipulator have a known spatial relation to each other,
    wherein, to grasp an object with the manipulator, the object and the manipulator are located within a field of view of the camera, and
    wherein the manipulator is pressed to the object to be manipulated and grasps the object when a rigidity of the manipulator is increased to effect a change in a state of the jamming phase change material form a liquid behavior to solid behavior, by evacuating air from a housing of the manipulator holding the jamming phase change material to change a fluid volume in the manipulator housing, wherein, prior to activating the jamming material, an interior of the housing is at atmospheric pressure and the manipulator is pliable.

* * * * *

UNITED STATES PATENT AND TRADEMARK OFFICE
CERTIFICATE OF CORRECTION

PATENT NO. : 8,727,410 B2  
APPLICATION NO. : 12/711983  
DATED : May 20, 2014  
INVENTOR(S) : Christopher Vernon Jones et al.

Page 1 of 1

It is certified that error appears in the above-identified patent and that said Letters Patent is hereby corrected as shown below:

In the Claims

Column 15, claim 1, line 21, should read "a housing of the manipulator to switch from a liquid".

Signed and Sealed this
Second Day of December, 2014

Michelle K. Lee
*Deputy Director of the United States Patent and Trademark Office*